United States Patent [19]

Larsson

[11] Patent Number: 5,650,848
[45] Date of Patent: Jul. 22, 1997

[54] INTERFEROMETER COMPENSATION FOR DISPLACEMENT INACCURACIES DURING PATH LENGTH DIFFERENCE ALTERING, METHOD THEREFOR, AND FOURIER TRANSFORM SPECTROMETER USING THE SAME

[75] Inventor: Kaj Larsson, Lund, Sweden

[73] Assignee: Opsis AB, Furulund, Sweden

[21] Appl. No.: 402,053

[22] Filed: Mar. 10, 1995

[30] Foreign Application Priority Data

Mar. 10, 1994 [SE] Sweden .................... 9400819

[51] Int. Cl.$^6$ .................................................. G01B 9/02
[52] U.S. Cl. ........................................................ 356/346
[58] Field of Search ................................. 356/345, 346

[56] References Cited

U.S. PATENT DOCUMENTS

| | | |
|---|---|---|
| 4,165,183 | 8/1979 | Hall et al. ........................ 356/346 |
| 4,319,843 | 3/1982 | Gornall ........................... 356/346 |
| 4,383,762 | 5/1983 | Burkert . |
| 4,684,255 | 8/1987 | Ford . |
| 5,066,990 | 11/1991 | Rippel . |
| 5,150,172 | 9/1992 | Brierley . |
| 5,159,405 | 10/1992 | Ukon . |

FOREIGN PATENT DOCUMENTS

| | | |
|---|---|---|
| 314103 | 5/1989 | European Pat. Off. . |
| 491435 | 6/1992 | European Pat. Off. . |

*Primary Examiner*—Samuel A. Turner

[57] ABSTRACT

An interferometer includes a beam splitter (BS) and two scanning mirrors (M1, M2), which are parallel and disposed on a common slide member that can be linearly displaced. The interferometer further comprises two compensating mirrors (M3, M4), which are disposed between the beam splitter (BS) and the scanning mirrors (M1, M2). The beam splitter (BS) and each of the compensating mirrors (M3, M4) are orthogonal. The interferometer has good tolerance for displacement inaccuracies of the scanning mirrors (M1, M2). The interferometer may be used for producing a compact and inexpensive Fourier transform spectrometer.

11 Claims, 5 Drawing Sheets

INTERFEROMETER COMPENSATION FOR DISPLACEMENT INACCURACIES DURING PATH LENGTH DIFFERENCE ALTERING, METHOD THEREFOR, AND FOURIER TRANSFORM SPECTROMETER USING THE SAME

FIELD OF THE INVENTION

This invention relates to an interferometer comprising a beam splitter, which is adapted to produce a first and a second beam from an incident beam, and a first and a second reflector, which are adapted to receive, respectively, the first and the second beam and to reflect them back to the beam splitter.

The invention further concerns a Fourier transform spectrometer.

BACKGROUND OF THE INVENTION

The conventional Michelson interferometer, which essentially consists of a beam splitter and a first and a second mirror, is an example of an interferometer of the above type. In the Michelson interferometer, the beam splitter reflects part of the incident beam towards the first mirror, and transmits part of the incident beam towards the second mirror. The two mirrors reflect the beams back to the beam splitter, which combines them to a single beam which then impinges upon a detector. Depending on the difference in distance between the beam splitter and the respective mirrors, a constructive or destructive interference arises between the beams. This interference can be registered with the aid cf the detector.

A Michelson-type interferometer may, for instance, be utilised in a Fourier transform spectrometer for determining the spectrum of the light from a broadband light source. In the conventional Fourier transform spectrometer, the one mirror serves as scanning mirror and is linearly displaced so that the distance to the beam splitter, and hence the interference pattern on the detector, is continuously changed. In this way, an interferogram can be registered by the detector. With the aid of Fourier transformation, the spectrum of the incident light can then be determined.

An inconvenience of conventional interferometers is that the optical components have to be accurately set in relation to each other in order to obtain an interference pattern fit for use.

In the Michelson interferometer, the beam splitter is so arranged that the angle of incidence of the incident beam is 45°. Furthermore, the first and the second mirror are orthogonal, and the first and the second beam impinge upon the mirrors in the normal direction. If, say, the one mirror is so displaced that the beam does not arrive in the normal direction, the fringe density of the interference pattern will increase. When there is a considerable displacement, the fringes cannot be observed as a result of too high a density.

In the Fourier transform spectrometer, the accurate setting has to be maintained during the whole linear displacement of the scanning mirror, which makes the mounting critical.

In order to lower the high requirements for an accurate setting during the displacement, the mirrors may in known manner be replaced with retroreflectors. However, retroreflectors are expensive, and it is furthermore impossible to compensate for any angle errors that may arise in production or as a result of temperature changes, ageing and the like.

In order to maintain an accurate setting of the optical components, it is further known to utilise fixed mirrors for reflecting the two beams back to the beam splitter and to alter the path length of the one beam with the aid of a rotatable element, for instance a rotatable etalon. EP 0 491 435 discloses an interferometer having two parallel, opposed mirrors, which are rotated in order to alter the path length to the one fixed mirror. However, this technique has the disadvantage of the beams moving across the surfaces of the fixed mirrors, such that extremely high requirements are placed on the quality thereof. Furthermore, the path length can only be altered to a minor extent.

In the literature, there are examples of further developments of the above principles intended to enable an increase of the difference in path length between the two beams. In EP 0 314 103 and U.S. Pat. No. 5,066,990, for instance, the rotating element consists of a double pendulum having a retroflector on each arm. By swinging the double pendulum, the path length of the one beam is reduced, whereas the path length of the other beam is increased. However, the inconvenience associated with the retroreflectors remains.

In U.S. Pat. No. 5,159,405 and U.S. Pat. No. 5,150,172, the rotating element consists of two parallel mirrors, between which the two beams are reflected a number of times. When the two mirrors are turned, the path length of the one beam is lengthened, whereas the path length of the other beam is shortened. However, the inconvenience of the beams moving across the mirrors still remains.

SUMMARY OF THE INVENTION

One object of the invention is to provide an interferometer which has good tolerance for displacement inaccuracies of the scanning optical components, which may be of compact design, and in which the beams do not move across the optical components when the difference in path length between the beams is altered.

Another object cf the invention is to provide a Fourier transform spectrometer which may be of compact design.

These and other objects may be attained by constructing an interferometer based on the principle of there being a linear displacement of the reflectors reflecting the first and the second beam back to the beam splitter in order to alter the difference in path length. In this manner, the two beams will, during the entire scanning operation, impinge upon the reflectors at the same points. Due to the simultaneous linear displacement of the two reflectors, the ratio between, on the one hand, the alteration of the difference in path length and, on the other hand, the displacement of the respective mirrors is 4:1, which means that a considerable alteration of the difference in path length can be achieved while retaining a compact design of the interferometer.

Furthermore, the interferometer comprises a third and a fourth reflector disposed in the beam paths of, respectively, the first and the second beam between the beam splitter and, respectively, the first and the second reflector. The third and the fourth reflector as well as the beam splitter are so positioned as to be orthogonal. More specifically, the normal directions of the beam splitter, the third and the fourth reflector are orthogonal.

Thus, the interferometer has a three-dimensional configuration. The third and the fourth reflector compensate for any inaccuracies of the linear displacement of the first and the second reflector, the third reflector compensating for the inaccuracies in one direction, while the fourth reflector compensates for the inaccuracies in another direction perpendicular to the first. Such compensation is possible due to the face that the first and the second reflector are fixedly interconnected, so that imperfections of the linear displacement have the same effect on the two reflectors. Finally, it should be pointed out that, in the interferometer according to the invention, the beams are reflected but a few times and the beam paths are short, which is an advantage.

A few embodiments of the invention will now be described in more detail with reference to the accompanying drawings.

DESCRIPTION OF PREFERRED EMBODIMENTS

Figure 1:
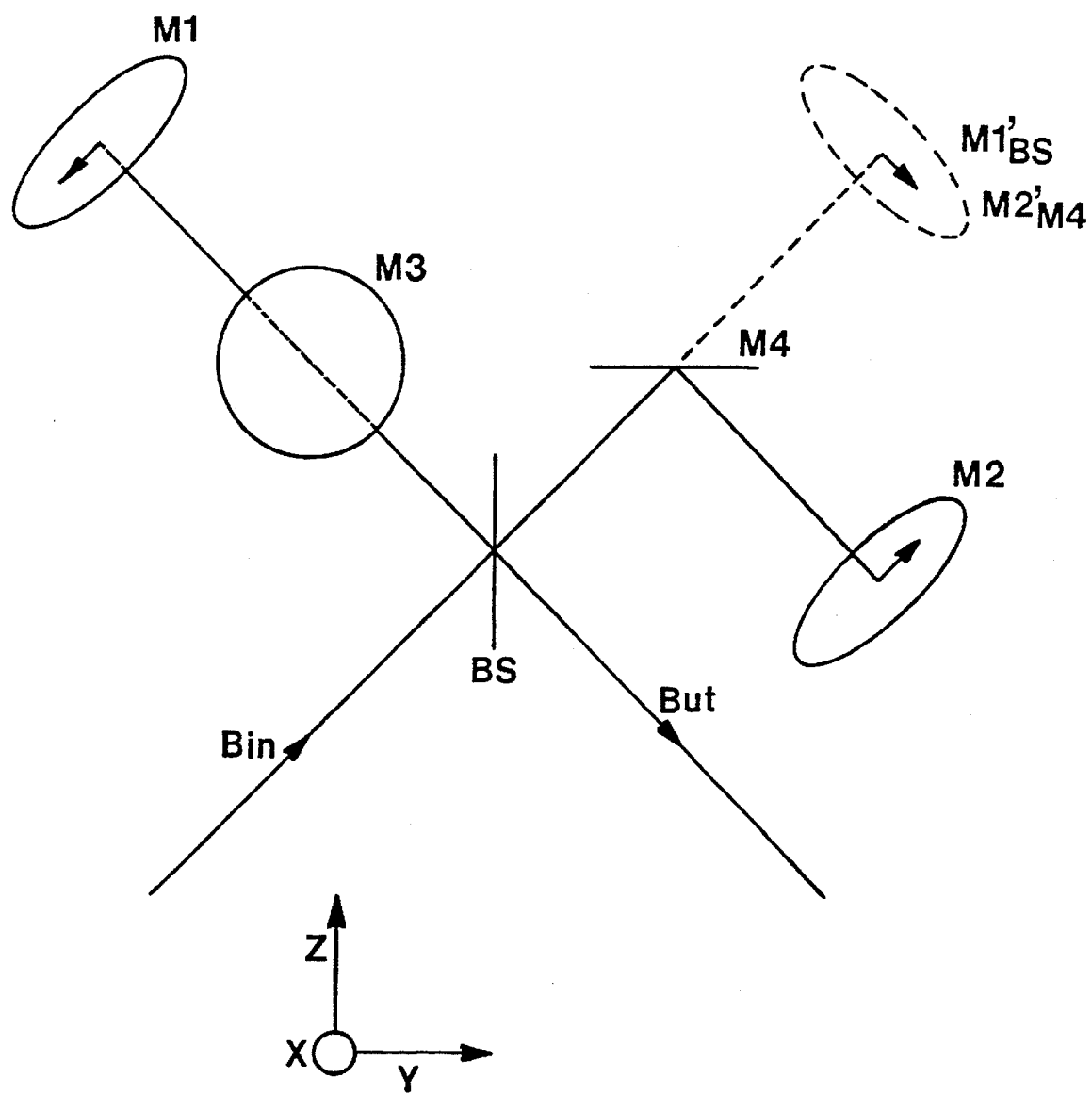
FIGS. 1, 2 and 3 are schematic projections in three different orthogonal directions of a first embodiment of the interferometer according to the invention.
Figure 2:
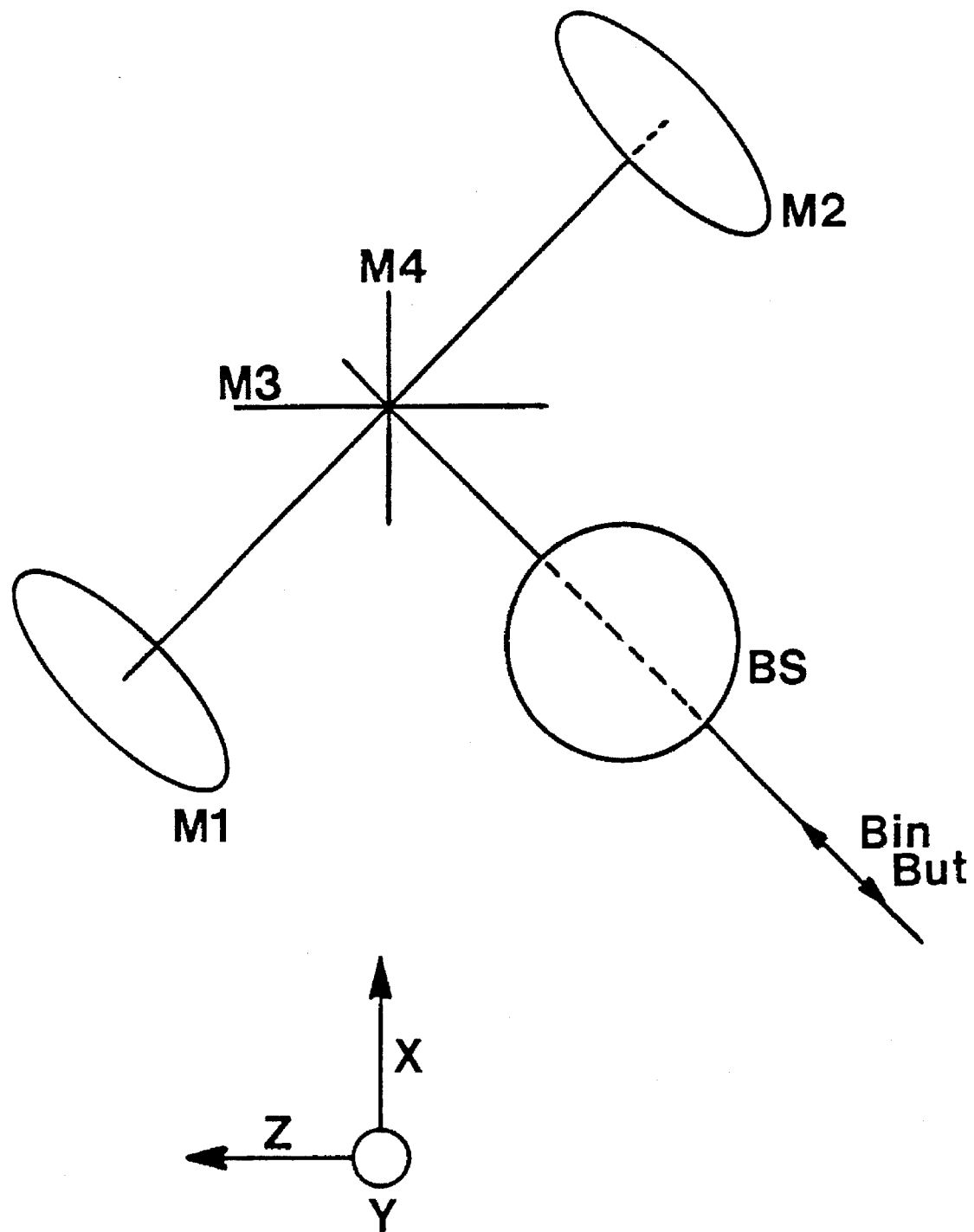
Figure 3:
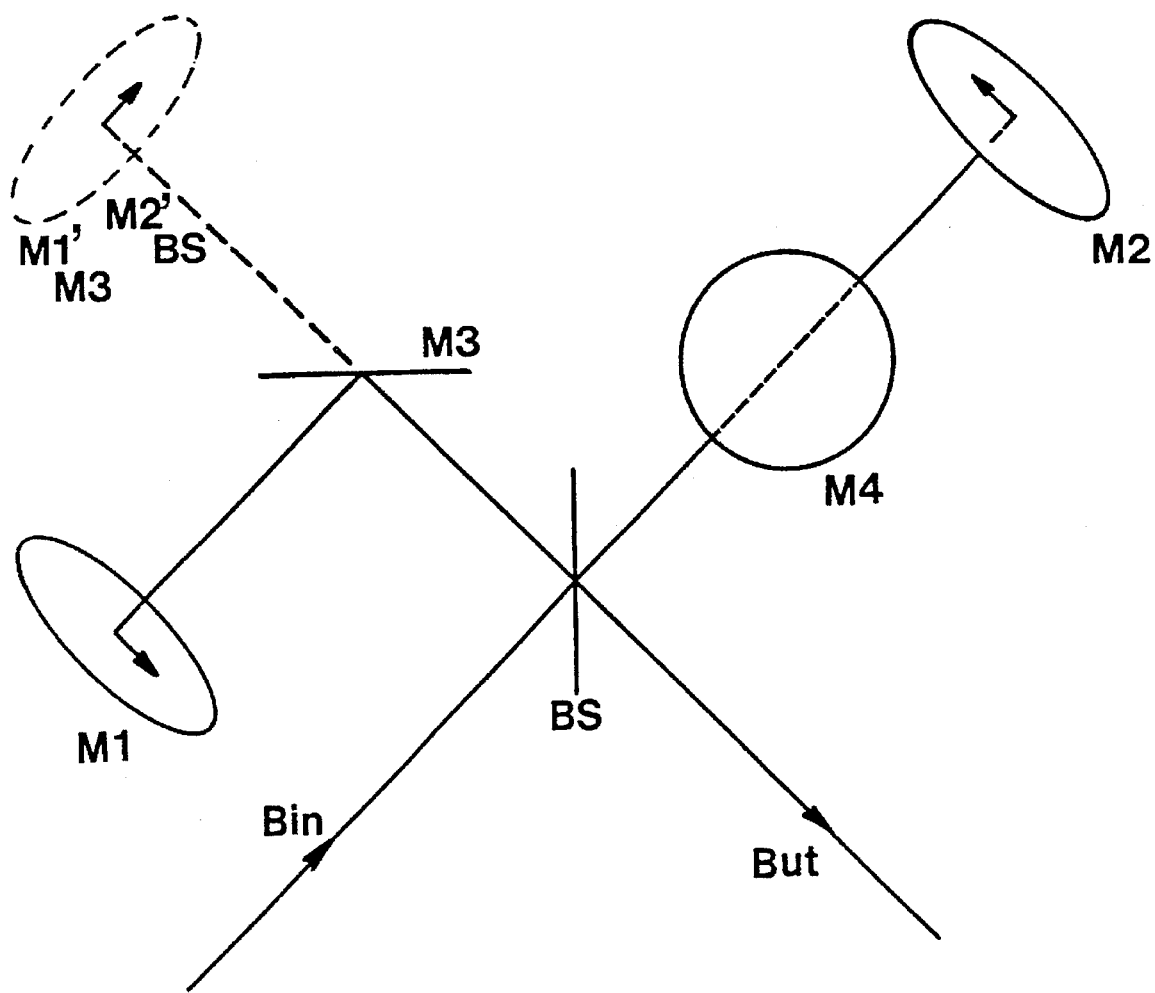
Figure 3:
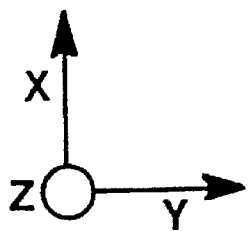

FIGS. 1, 2 and 3 are three orthogonal projections of a first embodiment of the interferometer according to the invention. Thus, the interferometer comprises a beam splitter BS, as well as a first, a second, a third and a fourth planar mirror M1, M2, M3 and M4, respectively. The first mirror M1 and the second mirror M2 are parallel and opposed. These mirrors constitute the scanning mirrors of the interferometer and are, to this end, disposed on a slide member (not shown) which is mounted in a ball bearing and which can be linearly displaced. As appears from the following, a certain deviation from a perfectly linear displacement is acceptable. The third mirror M3 and the fourth mirror M4 constitute the compensating mirrors of the interferometer. The third mirror M3 is disposed in the beam path between the beam splitter BS and the first mirror M1, and the fourth mirror M4 is disposed in the beam path between the beam splitter BS and the second mirror M2 in similar fashion. The third mirror M3, the fourth mirror M4 and the beam splitter BS are orthogonal.

It should be observed than the mirrors in all the figures have been provided with arrows to facilitate a comparison between the mirror images and to indicate irregularities in the linear movement.

The interferometer operates as follows. A beam Bin from a light source (not shown) impinges upon the beam splitter BS, which in known fashion reflects part of the incident beam and transmits part thereof. Thus, the beam splitter produces a first beam B1 and a second beam B2 from the incident beam. The first beam impinges upon the third mirror M3 and is reflected thereby to the first mirror M1 and hence back to the beam splitter BS via the mirror M3. The second beam B2 impinges upon the fourth mirror M4 and is reflected thereby to the second mirror M2 and hence back to the beam splitter BS via the fourth mirror M4. The second beam B2 and the first beam B1 are, by the beam splitter BS, combined to an outgoing beam But.

In FIGS. 1 and 3, it is indicated by dashed lines that the beam splitter BS superimposes the image of the first mirror M1 on the image of the second mirror M2 mirrored in the fourth mirror M4. Thus, $M1'_{BS}$ designates the image of the first mirror M1 mirrored in the beam splitter BS, and $M2'_{M4}$ designates the image of the second mirror mirrored in the fourth mirror M4.

Should the slide member, on which the first and the second mirror M1 and M2 are mounted, be slightly inaccurately set or should its position be altered in the linear displacement, such that the first and the second beam B1 and B2 do not impinge upon these mirrors in the normal direction, the fourth mirror M4 will compensate for any displacements in the Y-Z plane and the third mirror M3 will compensate for any displacements in the X-Y plane. Suppose the slide member is so displaced that the first mirror M1 is displaced in the Z-Y plane in the direction indicated by the arrow in FIG. 1, then the second mirror M2 will also be displaced in the Z-Y plane in the direction indicated by the arrow therein. The mirror images $M1'_{BS}$ and $M2'_{M4}$ will then both be displaced in the direction indicated by the arrow in the mirror images, such that they will still coincide. Thus, the two beams B1 and B2 will coincide when combined with each other by the beam splitter BS, despite the angle error.

Should the first and the second mirror M1 and M2 be displaced in the X-Y plane, the third mirror compensates for the displacement in similar fashion, such that the mirror images $M1'_{M3}$ and $M2'_{BS}$ coincide and that the first and the second beam B1 and B2 are parallel when leaving the beam splitter BS.

There are a large number of configurations meeting the requirements that the beam splitter BS, the third mirror M3 and the fourth mirror M4 be orthogonal and that the first mirror M1 and the second mirror M2 be parallel and opposed. A few Examples are given below.

EXAMPLE 1

In the following, ñ indicates the normal direction of the respective components.

$$\hat{n}BS = (0, 1, 0)$$

$$\hat{n}M1 = \frac{1}{\sqrt{3}} (1, 1, -1)$$

$$\hat{n}M2 = \frac{1}{\sqrt{3}} (-1, -1, 1)$$

$$\hat{n}M3 = (-1, 0, 0)$$
$$\hat{n}M4 = (0, 0, -1)$$

The incident beam Bin arrives along $$\frac{1}{\sqrt{3}} (1, 1, 1).$$

The outgoing beam But leaves along $$\frac{1}{\sqrt{3}} (1, -1, 1).$$

The angle of incidence to the beam splitter BS and to the first and the third mirror M1, M3 is approximately 55°, and the angle of incidence to the second and the fourth mirror M2, M4 is 90°.

The beams are parallel to the space diagonals of a cube.

EXAMPLE 2

$$nBS = (0, 1, 0)$$

$$nM1 = \frac{1}{\sqrt{6}} (1, 2, -1)$$

$$nM2 = \frac{1}{\sqrt{6}} (-1, -2, 1)$$

$$nM3 = (-1, 0, 0)$$

-continued $$nM4 = (0, 0, -1)$$

The incident beam Bin arrives along $$\frac{1}{\sqrt{6}} (1, -2, 1).$$

The outgoing beam But leaves along $$\frac{1}{\sqrt{6}} (-1, -2, -1).$$

The angle of incidence to the beam splitter BS is approximately 35°; the angle of incidence to the first and the third mirror M1, M3 is approximately 66°; and the angle of incidence to the second and the fourth mirror M2, M4 is 90°.

Figure 4:
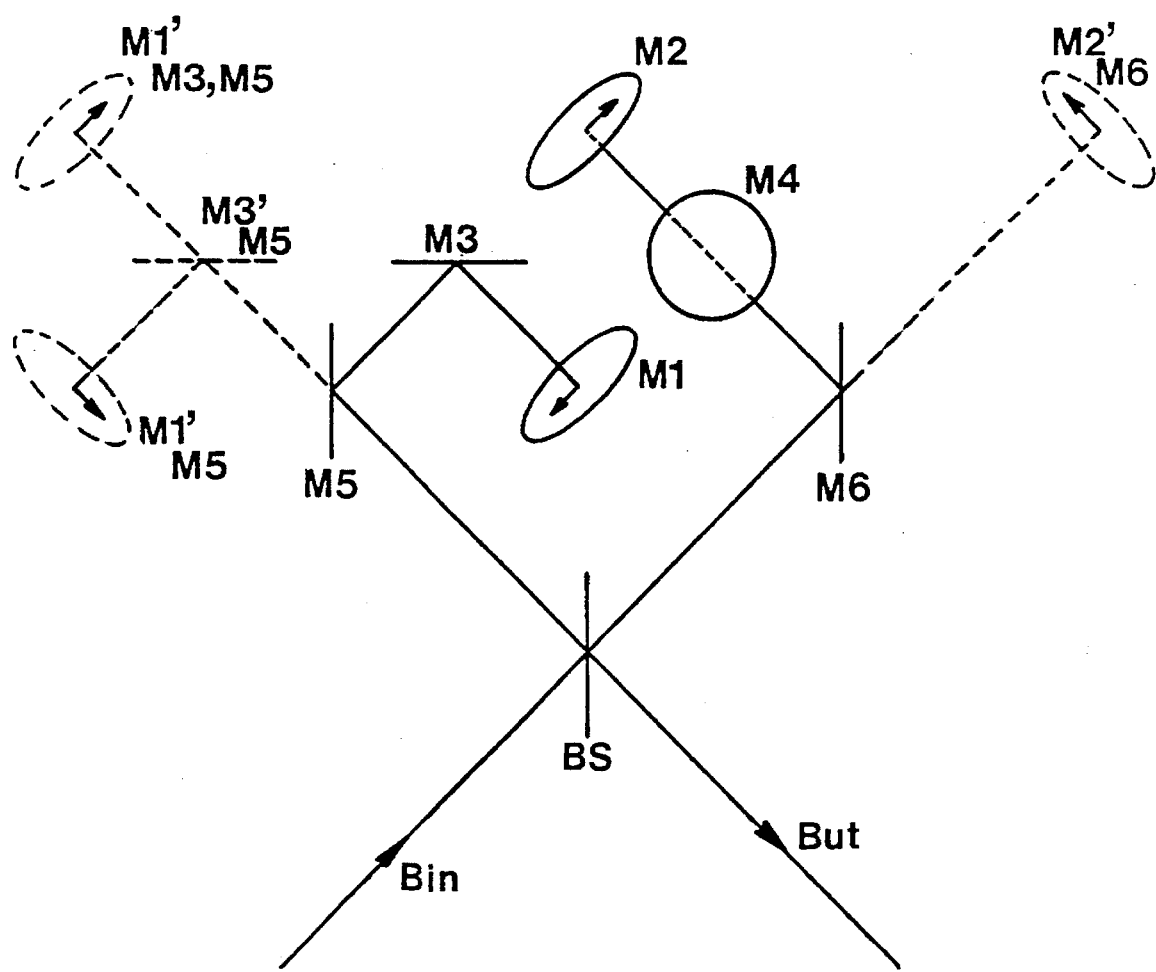
FIG. 4 is a schematic projection of a second embodiment of the interferometer according to the invention.

FIG. 4 illustrates a second embodiment of the interferometer according to the invention. This embodiment has retained the beam splitter BS and the four mirrors M1–M4 from the first embodiment. However, the second embodiment further comprises a fifth and a sixth mirror M5 and M6, which are parallel to the beam splitter BS and disposed in the beam path of the first beam B1 between the beam splitter BS and the third mirror M3 and in the beam path of the second beam B2 between the beam splitter BS and the fourth mirror M4, respectively.

In this embodiment, the scanning mirrors M1 and M2 are slightly closer to one another than in the first embodiment, enabling a more compact design of the interferometer. However, this embodiment requires two more mirrors than the first embodiment.

Figure 5:
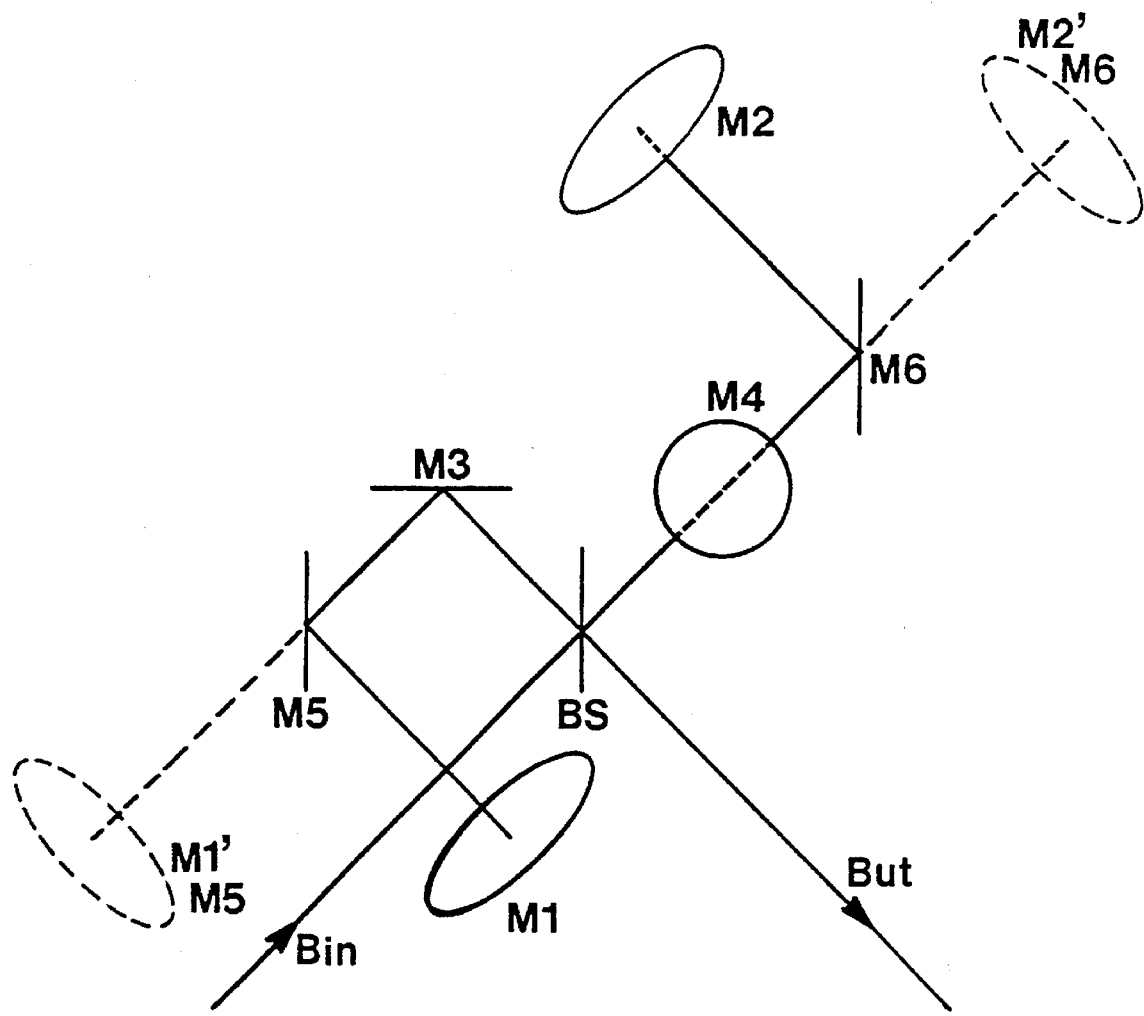
FIG. 5 is a schematic projection of a third embodiment of the interferometer according to the invention.

FIG. 5 illustrates a third embodiment, which comprises the same components as the second embodiment but in which the fifth and the sixth mirror are disposed between the first and the third mirror M1, M3 and between the second and the fourth mirror M2, M4, respectively.

The second and the third embodiment operate in the same way as the first embodiment.

The interferometer according to the invention is advantageously utilised in a Fourier transform spectrometer, which thus may be of compact and inexpensive design.

It goes without saying that the above embodiments of the invention are but examples and that the invention may be modified within the scope of the appended claims. For instance, the planar scanning mirrors M1, M2 may be replaced with other reflectors, such as retroreflectors.

I claim:

1. An interferometer comprising:
   a beam splitter, which receives an incident beam and outputs a first and a second beam;
   a first and a second planar mirror, which are adapted to receive, respectively, the first and the second beam from said beam splitter, and to respectively reflect the first and the second beam back to the beam splitter;
   means for fixedly interconnecting and essentially linearly displacing the first and the second planar mirror in order to alter the difference in path length between the first and the second beam;
   a third planar mirror, which is disposed in a beam path of the first beam between the beam splitter and the first planar mirror; and
   a fourth planar mirror, which is disposed in a beam path of the second beam between the beam splitter and the second planar mirror,
   wherein the beam splitter, the third planar mirror and the fourth planar mirror are orthogonal.

2. An interferometer as set forth in claim 1, further comprising a fifth and a sixth planar mirror disposed in the beam paths of the first beam (B1) and the second beam (B2), respectively.

3. An interferometer as set forth in claim 2, wherein the fifth planar mirror is disposed between the beam splitter and the third planar mirror, and the sixth planar mirror is disposed between the beam splitter and the fourth planar mirror.

4. An interferometer as set forth in claim 2, wherein the fifth planar mirror is disposed between the first and the third planar mirror, and the sixth planar mirror is disposed between the second and the fourth planar mirror.

5. A Fourier transform spectrometer comprising an interferometer as set forth in claim 1.

6. A Fourier transform spectrometer comprising an interferometer as set forth in claim 2.

7. A Fourier transform spectrometer comprising an interferometer as set forth in claim 3.

8. A Fourier transform spectrometer comprising an interferometer as set forth in claim 4.

9. An interferometer as set forth in claim 1 wherein, due to orthogonal positioning of the beam splitter, the third planar mirror, and the fourth planar mirror, the first and second beams coincide when reflected back to the beam splitter by the first and second planar mirrors.

10. A method for compensating for displacement inaccuracies during altering of path length differences in an interferometer comprising the steps of:
   producing a first and a second beam from a beam splitter;
   reflecting, via a respective first and second reflector, said first and second beam back to said beam splitter;
   fixedly interconnecting said first and second reflectors;
   altering the difference in path length between said first and second beam by essentially linearly displacing said first and second reflectors;
   disposing a third reflector between said beam splitter and said first reflector;
   disposing a fourth reflector between said beam splitter and said second reflector; and
   orienting said beam splitter, said third reflector and said fourth reflector to be orthogonal to one another, thereby compensating for inaccuracies in the essentially linear displacement of said first and second reflectors.

11. A method as set forth in claim 10, further comprising, due to said orienting step, coinciding said first and second beams on said beam splitter during said reflecting step.

* * * * *